US012608739B1

(12) United States Patent
Rathoure et al.

(10) Patent No.: US 12,608,739 B1
(45) Date of Patent: Apr. 21, 2026

(54) SYSTEMS AND METHODS OF MULTIMODAL INTERACTION-BASED E-COMMERCE

(71) Applicant: Blue Yonder Group, Inc., Scottsdale, AZ (US)

(72) Inventors: Pankaj Rathoure, Hyderabad (IN); Mayank Tiwari, Serilingampalle (IN); Santosh Kumar, Ramgarh Cantt (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 120 days.

(21) Appl. No.: 18/409,259

(22) Filed: Jan. 10, 2024

Related U.S. Application Data

(60) Provisional application No. 63/534,261, filed on Aug. 23, 2023, provisional application No. 63/527,736, filed on Jul. 19, 2023, provisional application No. 63/527,742, filed on Jul. 19, 2023, provisional application No. 63/527,740, filed on Jul. 19, 2023, provisional application No. 63/458,325, filed on Apr. 10, 2023, provisional application No. 63/445,163, filed on Feb. 13, 2023, provisional application No. 63/445,154, filed on Feb. 13, 2023, provisional application No. 63/445,161, filed on Feb. 13, 2023.

(51) Int. Cl.
| | |
|---|---|
| *G06Q 30/00* | (2023.01) |
| *G06Q 30/0201* | (2023.01) |
| *G06Q 30/0601* | (2023.01) |

(52) U.S. Cl.
CPC ..... *G06Q 30/0631* (2013.01); *G06Q 30/0201* (2013.01)

(58) Field of Classification Search
CPC ...................................................... G06Q 30/06
See application file for complete search history.

(56) References Cited

U.S. PATENT DOCUMENTS

| | | | | |
|---|---|---|---|---|
| 6,577,329 | B1 * | 6/2003 | Flickner | .................. G06F 3/013 |
| | | | | 715/831 |
| 7,120,486 | B2 | 10/2006 | Leuthardt et al. | |

(Continued)

FOREIGN PATENT DOCUMENTS

| | | |
|---|---|---|
| CN | 203802460 U | 9/2014 |

*Primary Examiner* — Mila Airapetian
(74) *Attorney, Agent, or Firm* — Spencer Fane LLP; Steven J. Laureanti

(57) ABSTRACT

A system and method are disclosed for performing multimodal fusion for e-commerce. The method includes monitoring a focus prompt of a current user, detecting a response of the current user corresponding to a displayed item, collecting attributes of the displayed item at different levels and track a focus and an emotional state of the current user, calculating an action-based similarity to generate a recommendation score of action similarity, applying collaborative filtering on a user-user similarity, identifying a most similar user to the current user based on the applied collaborative filtering to generate a user-user similarity, combine the recommendation score with the user-user similarity and superimpose a response classifier to generate a combined adaptive weighting scheme, identifying top suggested actions the current user is expected to perform based on the combined adaptive weighting scheme, and recommending an item or service to the current user based on the top suggested actions.

20 Claims, 9 Drawing Sheets

(56)        References Cited

U.S. PATENT DOCUMENTS

|  |  |  |  |  |
|---|---|---|---|---|
| 8,401,248 | B1 * | 3/2013 | Moon | G06V 40/18 |
|  |  |  |  | 382/103 |
| 9,836,756 | B2 * | 12/2017 | Rider | G06V 40/165 |
| 10,111,611 | B2 * | 10/2018 | el Kaliouby | G16H 20/70 |
| 2014/0108309 | A1 * | 4/2014 | Frank | G06Q 50/01 |
|  |  |  |  | 706/12 |
| 2014/0375752 | A1 * | 12/2014 | Shoemake | G06V 40/10 |
|  |  |  |  | 348/14.07 |
| 2015/0026708 | A1 * | 1/2015 | Ahmed | H04N 21/812 |
|  |  |  |  | 725/12 |
| 2018/0020963 | A1 * | 1/2018 | Friant | G06Q 30/0269 |
|  |  |  |  | 705/14.66 |
| 2019/0043064 | A1 * | 2/2019 | Chin | G06Q 30/0201 |

* cited by examiner

~300

400

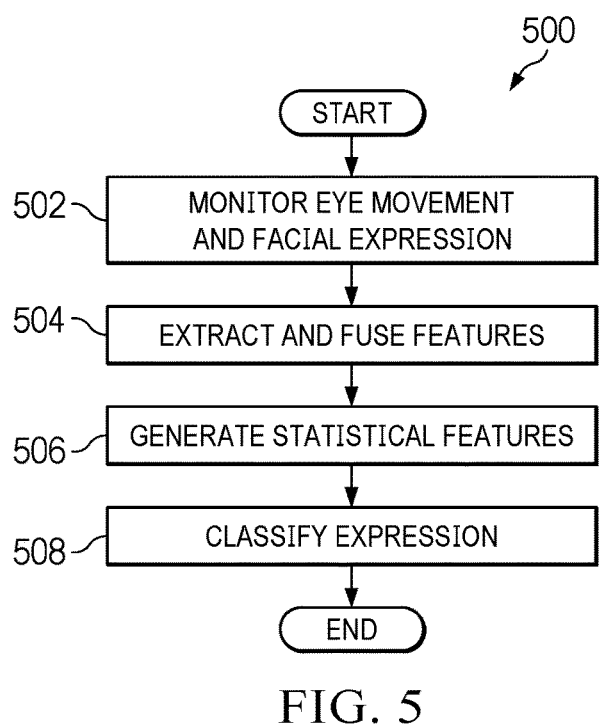

500

START

502 — MONITOR EYE MOVEMENT AND FACIAL EXPRESSION

504 — EXTRACT AND FUSE FEATURES

506 — GENERATE STATISTICAL FEATURES

508 — CLASSIFY EXPRESSION

END

FIG. 5

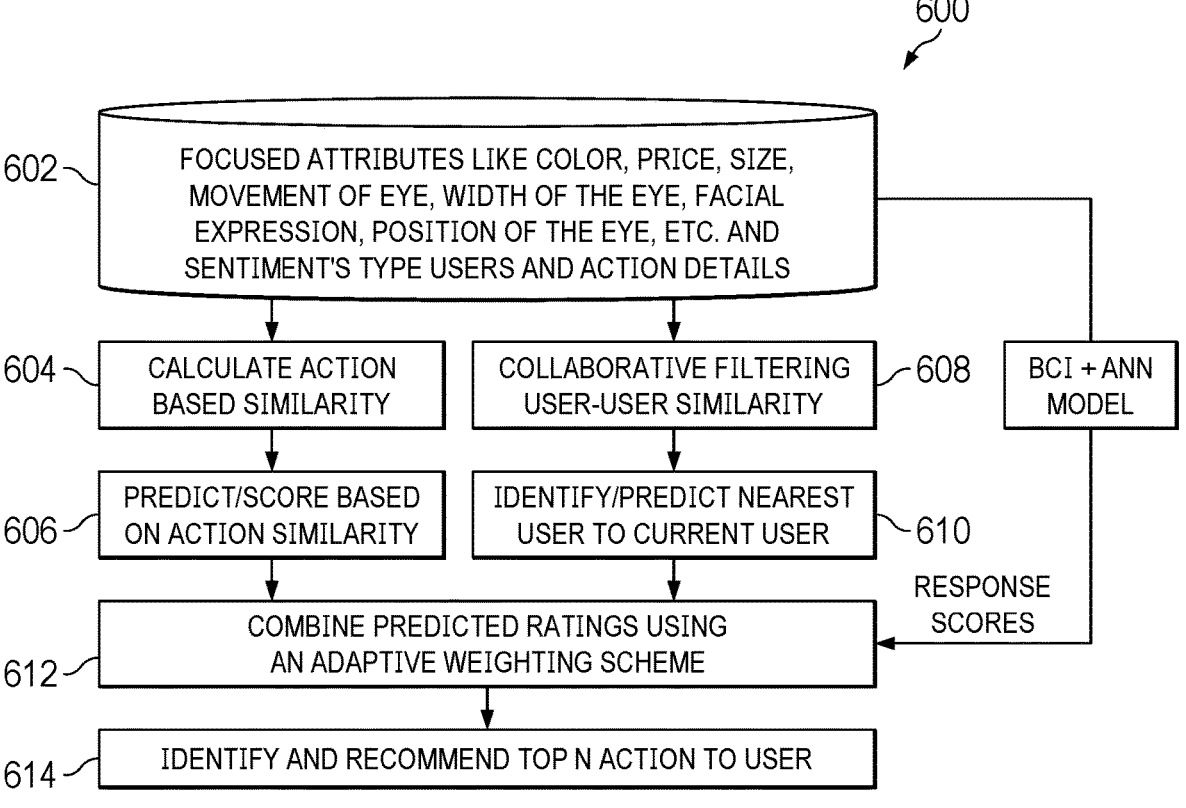

600

602 — FOCUSED ATTRIBUTES LIKE COLOR, PRICE, SIZE, MOVEMENT OF EYE, WIDTH OF THE EYE, FACIAL EXPRESSION, POSITION OF THE EYE, ETC. AND SENTIMENT'S TYPE USERS AND ACTION DETAILS

604 — CALCULATE ACTION BASED SIMILARITY

608 — COLLABORATIVE FILTERING USER-USER SIMILARITY

BCI + ANN MODEL

606 — PREDICT/SCORE BASED ON ACTION SIMILARITY

IDENTIFY/PREDICT NEAREST USER TO CURRENT USER — 610

RESPONSE SCORES

612 — COMBINE PREDICTED RATINGS USING AN ADAPTIVE WEIGHTING SCHEME

614 — IDENTIFY AND RECOMMEND TOP N ACTION TO USER

| INTERFACE TYPE 902 | (AFTER PRACTICE OF AT LEAST 30 ATTEMPTS) | | MOTION DEPENDENCY (PX/Sec) |
| | TOTAL RESPONSE TIME 904 | ERROR RATE (%) 906 | MOTION DEPENDENCY (PX/Sec) 908 |
|---|---|---|---|
| MOUSE | 1mil Sec - 1 Sec | 0 - 2 | YES |
| KEYBOARD | 0.1 Sec - 1 Sec | 0 - 5 | YES |
| GESTURE/EXPRESSION | 0.01 Sec - 1 mil Sec | 0 - 7 | NA |
| VUI | 1 mil Sec - 0.1 mil Sec | 0 - 7 | NA |
| BCI | 0.01 mil Sec - 1 mil Sec | 0 - 9 | NA |

TOTAL RESPONSE TIME = SIMPLE REACTION TIME (VARIES AS PER PRACTICE) + INFORMATION TRANSFER RATE (MOSTLY CONSTANT FOR ALL) + FEEDBACK UPDATE INTERVAL (MOSTLY CONSTANT FOR ALL)

FIG. 9

SYSTEMS AND METHODS OF MULTIMODAL INTERACTION-BASED E-COMMERCE

CROSS-REFERENCE TO RELATED APPLICATIONS

The present disclosure is related to that disclosed in U.S. Provisional Application No. 63/534,261, filed Aug. 23, 2023, entitled "Systems and Methods of Multimodal Inter-action-Based Task Performance Using Immersive Guidance," U.S. Provisional Application No. 63/527,742, filed Jul. 19, 2023, entitled "Systems and Methods of Multimodal Interaction-Based Omni-Channel Commerce Using Immersive Guidance," U.S. Provisional Application No. 63/527,740, filed Jul. 19, 2023, entitled "Systems and Methods of Multimodal Interaction-Based Supply Chain Planning Using Immersive Guidance," U.S. Provisional Application No. 63/527,736, filed Jul. 19, 2023, entitled "Systems and Methods of Multimodal Interaction-Based Supply Chain Execution Using Immersive Guidance," U.S. Provisional Application No. 63/458,325, filed Apr. 10, 2023, entitled "Systems and Methods of Multimodal Interaction-Based Supply Chain Execution," U.S. Provisional Application No. 63/445,163, filed Feb. 13, 2023, entitled "Systems and Methods of Multimodal Interaction-Based E-Commerce," U.S. Provisional Application No. 63/445,161, filed Feb. 13, 2023, entitled "Systems and Methods of Multimodal Inter-action-Based Supply Chain Planning," and U.S. Provisional Application No. 63/445,154, filed Feb. 13, 2023, entitled "Systems and Methods of Multimodal Interaction-Based Interface." U.S. Provisional Application Nos. 63/534,261, 63/527,742, 63/527,740, 63/527,736, 63/458,325, 63/445, 163, 63/445,161, and 63/445,154 are assigned to the assignee of the present application. The present invention hereby claims priority under 35 U.S.C. § 119(e) to U.S. Provisional Application Nos. 63/534,261, 63/527,742, 63/527,740, 63/527,736, 63/458,325, 63/445,163, 63/445, 161, and 63/445,154.

TECHNICAL FIELD

The present disclosure relates generally to e-commerce and more specifically to multimodal fused interaction for e-commerce.

BACKGROUND

When using a software application, users work with finite intents and encounter many micro-moments in which they need to act on or get the most out of the intents. Current interface systems face challenges from the gap between the context of use (emotions and the environment) of the user, the intentions of the user, and the various possibilities on which to act on the intentions within the context of use. Current software interfaces are limited to mostly mouse and keyboard inputs. Using these inputs, cognitive processing of the user is required to identify what actions may be performed, how to perform those actions, and which motor movements are needed to use these peripherals. These drawbacks encompass the majority of the time needed to convert an intent of the user into an action performed by the software application interface, which prevents a natural way to interact with computer systems, inhibits productivity to perform finite and repetitive multitasks, and limits accessibility for users with special challenges, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 5 illustrates a method of multimodal blend modeling, in accordance with an embodiment;

FIG. 6 illustrates a method of action recommendation based on brain-computer interface signals, in accordance with an embodiment;

FIG. 9 illustrates a comparison chart showing total response time, error rate, and motion dependency for various interface types, in accordance with an embodiment;

DETAILED DESCRIPTION

Figure 1:
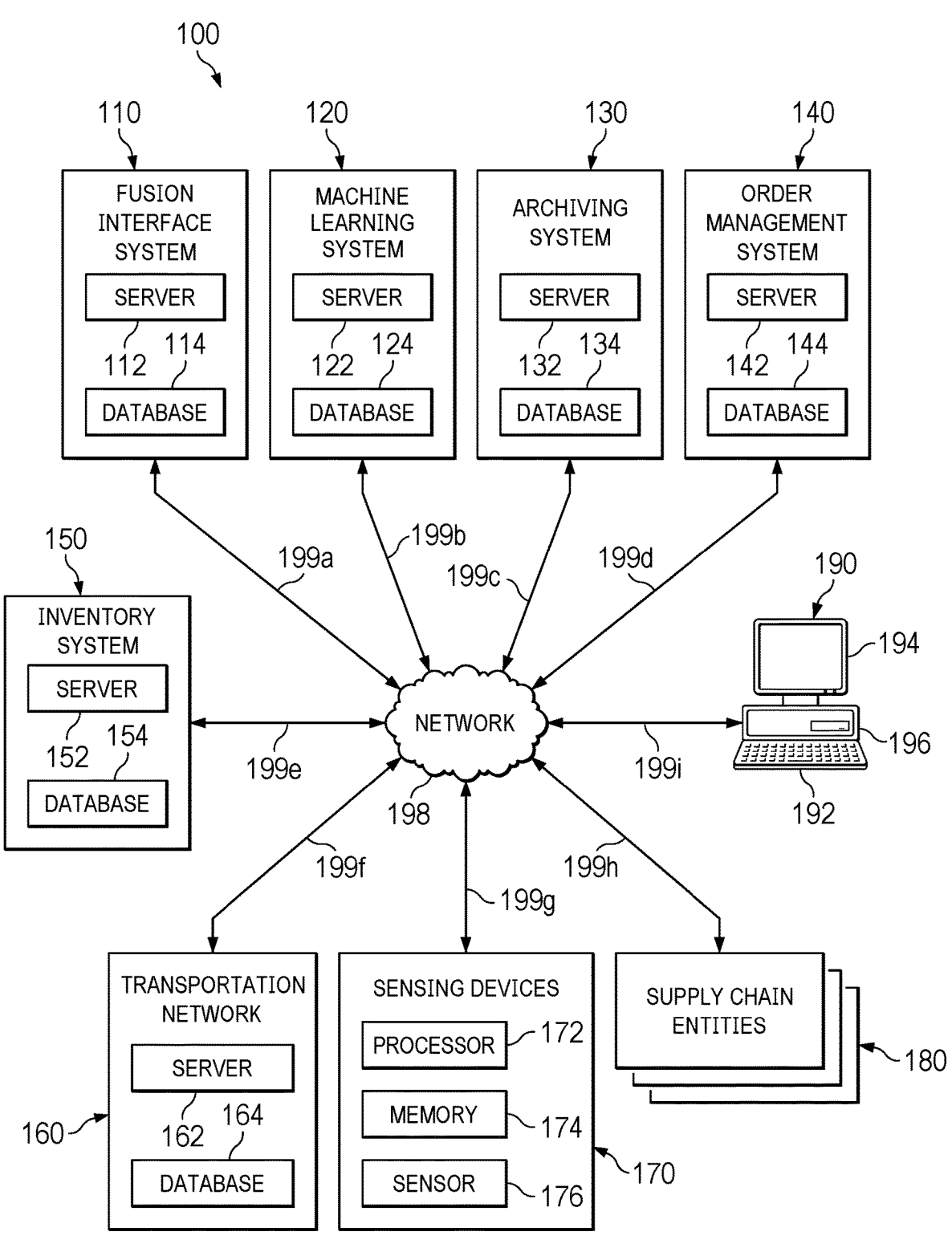
FIG. 1 illustrates an e-commerce system, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide systems and methods of natural visual manipulation of interfaces using multimodal interactions. Embodiments may monitor intent-driven actions using multimodal interaction fusion of brain-computer interface (BCI) input, voice-user interface (VUI) input, facial expressions and gestures, eye movements, mouse, keyboard, and/or the like. Embodiments may use a machine learning model to recognize user intents in e-commerce computer environments, assist users to perform application tasks and actions, and provide predicted actions and attribute-based recommendations for an e-commerce system which may comprise, for example, an order management system.

Embodiments of the following disclosure enable systems and methods to offer a unified user interface experience providing a more natural performance. Embodiments may provide increased accessibility to users with special challenges in performing interactions. Use of embodiments may improve productivity in performing finite and repetitive tasks, as well as tasks that involve high amounts of graphical manipulation, by improving interaction response time and accuracy using multiple modes of interaction.

FIG. 1 illustrates e-commerce system 100, in accordance with a first embodiment. E-commerce system 100 comprises fusion interface system 110, machine learning system 120, archiving system 130, order management system 140, inventory system 150, transportation network 160, one or more sensing devices 170, one or more supply chain entities 180, one or more computers 190, network 198, and one or more communication links 199a-199i. Although a single fusion interface system 110, a single machine learning system 120, a single archiving system 130, a single order management system 140, a single inventory system 150, a single transportation network 160, one or more sensing devices 170, one or more supply chain entities 180, one or more computers 190, a single network 198, and one or more communication links 199a-199i are shown and described, embodiments contemplate any number of fusion interface systems, machine learning systems, archiving systems, order management systems, inventory systems, transportation networks, sensing devices, supply chain entities, computers, networks, or communication links, according to particular needs.

In one embodiment, fusion interface system 110 comprises server 112 and database 114. As described in more detail below, embodiments of fusion interface system 110 monitor any combination of one or more modes of user input, including, for example, a mouse, a keyboard, a touchscreen, a BCI, a VUI, eye movement and position, facial expressions, gestures, and the like to monitor user interactions and behavior. Fusion interface system 110 may generate a fusion of multimodal inputs, such as, for example, BCI inputs, eye and facial movement, and behavioral data 220 (FIG. 2), to generate a response classifier that is used with a machine learning model to predict system actions and recommend items to provide assistive and adaptive e-commerce such as, for example, item recommendations based on eye position, data manipulation, visual content filtering and approval, data segmentation, and attribute prediction.

Machine learning system 120 of e-commerce system 100 comprises server 122 and database 124. In embodiments, machine learning system 120 trains one or more machine learning models using continuous learning to adapt to behaviors and preferences of a user to manipulate content, render information, and perform actions for order management system 140. According to embodiments, machine learning system 120 uses reinforcement learning to learn behavior from user interactions and adopt increasingly precise responses and feedback based on user interactions with fusion interface system 110, machine learning system 120, order management system 140, inventory system 150, one or more sensing devices 170, and/or one or more computers 190. Embodiments further contemplate using artificial intelligence (AI) to automatically improve the performed actions in a user interface (such as, for example, a graphical user interface (GUI)) of one or more enterprise applications such as, for example, an e-commerce platform, order management system 140, inventory system 150, and the like. According to embodiments, the machine learning model may comprise an Artificial Neural Network (ANN) or any other suitable machine learning model, according to particular needs.

Archiving system 130 of e-commerce system 100 comprises server 132 and database 134. Although archiving system 130 is shown as comprising a single server 132 and a single database 134, embodiments contemplate any suitable number of servers or databases internal to, or externally coupled with, archiving system 130. Server 132 of archiving system 130 may support one or more processes for receiving and storing data from fusion interface system 110, machine learning system 120, order management system 140, inventory system 150, transportation network 160, one or more sensing devices 170, one or more supply chain entities 180, and/or one or more computers 190 of e-commerce system 100. According to some embodiments, archiving system 130 comprises an archive of data received from fusion interface system 110, machine learning system 120, order management system 140, inventory system 150, transportation network 160, one or more sensing devices 170, one or more supply chain entities 180, and/or one or more computers 190 of e-commerce system 100, and archiving system 130 provides archived data to fusion interface system 110, machine learning system 120, order management system 140, inventory system 150, and transportation network 160, to, for example, train the machine learning model and generate predictions and recommendations, as described in further detail below. Server 132 may store the received data in database 134. Database 134 of archiving system 130 may comprise one or more databases or other data storage arrangement at one or more locations, local to, or remote from, server 132.

According to an embodiment, order management system 140 comprises server 142 and database 144. Server 142 comprises one or more modules to receive and generate orders for one or more products sold, for example, at one or more retailers, on an e-commerce website, or the like. By way of example only and not by way of limitation, order management system 140 may provide for receiving and displaying product descriptions, attributes, images, and the like, checking and tracking inventory, initiating purchase and receipt of items, conducting marketing of items and commercial promotions, managing customers and vendors, placing orders, issuing bills and receipts, and receiving and processing orders for one or more items. Server 142 stores and retrieves data from database 144 or one or more locations in e-commerce system 100. In addition, order management system 140 operates on one or more computers 190 that are integral to or separate from the hardware and/or software that support e-commerce system 100. As explained in greater detail below, order management system 140 provides, for example, data navigation, selection, and editing (e.g., workflows, databases, etc.), image editing (e.g., photo editing, illustration, publishing, etc.), e-commerce (shopping, product selection, etc.), and the like. Order management system 140 may comprise a GUI-based interface displaying one or more interactive graphical elements. Each of these one or more interactive graphical elements may represent a product, such as, for example, a description, an image (e.g., a photo, graphic, artwork, or the like), alphanumeric text, or any other graphical element. According to embodiments, each product represented by a graphical element may be defined by one or more attributes, including, for example, color, design, pattern, length, value (e.g., price), quantity, name, ID, availability, or the like. Attributes may comprise any categorical characteristic or quality of a product, and an attribute value may be a specific value or identity for the one or more items according to the categorical characteristic or quality. Each attribute may have a different attribute value. These attribute values include, for example, red, blue, green (for color), striped, floral, plaid (for pattern), long, short, high, (for length), and other like attributes and attribute values, according to particular needs. These attributes also determine, at least in part, user emotions and behavior, individually and as user groups defined by similar behavior, preferences for particular attribute values, or a combination of both. Additionally, products may be organized in categories. A category indicates a level in a hierarchy under which all products are described by the same attributes and/or the products are substitutable.

Inventory system 150 comprises server 152 and database 154. Server 152 of inventory system 150 is configured to receive and transmit item data, including item identifiers, pricing data, attribute data, inventory levels, and other like data about one or more items at one or more locations in e-commerce system 100. Server 152 stores and retrieves item data from database 154 or from one or more locations in e-commerce system 100. Inventory system 150 may send current inventory levels to order management system 140 and, in response, order management system 140 may determine and indicate whether the current inventory levels are sufficient to meet one or more planned purchases on e-commerce platform 100.

Transportation network 160 comprises server 162 and database 164. According to embodiments, transportation network 160 directs one or more transportation vehicles to ship one or more items between one or more supply chain entities 180, based, at least in part, on a sales forecast, product and attribute identification, and/or recommended alternative attributes determined by fusion interface system 110, the number of items currently in stock at one or more supply chain entities 180, the number of items currently in transit in transportation network 160, a forecasted demand, a supply chain disruption, and/or one or more other factors described herein. The transportation vehicles comprise, for example, any number of trucks, cars, vans, boats, airplanes, unmanned aerial vehicles (UAVs), cranes, robotic machinery, or the like. The transportation vehicles may comprise radio, satellite, or other communication that communicates location information (such as, for example, geographic coordinates, distance from a location, global positioning satellite (GPS) information, or the like) with machine learning system 120, order management system 140, inventory system 150, transportation network 160, and/or one or more supply chain entities 180 to identify the location of the transportation vehicles and the location of any inventory or shipment located on the transportation vehicles.

According to embodiments, one or more sensing devices 170 comprise one or more processors 172, memory 174, and one or more sensors 176 and may include any suitable input device, output device, fixed or removable computer-readable storage media, or the like. As explained in more detail below, one or more sensing devices 170 comprise one or more imaging sensors (e.g., corneal tracking sensors, iris tracking sensors, facial action coding (FACS) cameras or sensors, and the like) brainwave sensors of a BCI, heartrate sensors, skin galvanic sensors, microphones, and the like. According to embodiments, one or more sensing devices 170 comprise (or are coupled with) a computer, a monitor, a workstation, a mobile device, and the like. One or more sensing devices 170 monitor eye movements and location, facial features and movements, gestures, voice, behavior, emotions, brain signals, and the like of a user to control a GUI and/or one or more applications of e-commerce system 100. Additionally, one or more sensing devices 170 may identify users and items (or attributes of the users or items) near one or more sensors 176 and generate a mapping of the user or an item (and/or the detected attributes).

One or more sensing devices 170 may comprise a mobile handheld device such as, for example, a smartphone, a tablet computer, a wireless device, a networked electronic device, or the like. One or more sensors 176 of one or more sensing devices 170 may comprise an imaging sensor, such as, a camera, scanner, electronic eye, photodiode, charged coupled device (CCD), or any other sensor that detects electromagnetic radiation. In addition, or as an alternative, one or more sensors 176 may comprise a radio receiver and/or transmitter configured to read an electronic tag, such as, for example, an RFID tag. According to some embodiments, the functions and methods described in connection with one or more sensing devices 170 may be emulated by one or more modules configured to perform the functions and methods as described.

In addition, embodiments of one or more sensing devices 170 may comprise a mobile handheld electronic device such as, for example, a smartphone, a tablet computer, a wireless communication device, and/or one or more networked electronic devices configured to image items using one or more sensors 176 and transmit product images to one or more databases. According to an embodiment, one or more sensing devices 170 analyze images of products received from one or more sensors 176 and identify attributes, attribute values, identifiers, or the like. Each item may be represented in e-commerce system 100 by an identifier, including, for example, Stock-Keeping Unit (SKU), Universal Product Code (UPC), serial number, barcode, tag, RFID, or like objects that encode identifying information. One or more sensing devices 170 may generate a mapping of one or more items in e-commerce system 100 by scanning an identifier or object associated with an item and identifying the item based, at least in part, on the scan. This may include, for example, a stationary scanner located at one or more supply chain entities 180 that scans items as the items pass near the scanner.

One or more supply chain entities 180 may represent one or more suppliers, manufacturers, distribution centers, and retailers in one or more e-commerce systems, including one or more enterprises. One or more suppliers may be any suitable entity that offers to sell or otherwise provides one or more components to one or more manufacturers. One or more suppliers may, for example, receive a product from a first supply chain entity of one or more supply chain entities 180 in e-commerce system 100 and provide the product to another supply chain entity of one or more supply chain entities 180. One or more suppliers may comprise automated distribution systems that automatically transport products to one or more manufacturers. A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity of one or more supply chain entities 180, such as a supplier, an item that needs further processing, or any other item. A manufacturer may, for example, produce and sell a product to a supplier, another manufacturer, a distribution center, a retailer, a customer, or any other suitable person or entity. Such manufacturers may comprise automated robotic production machinery that produce products based, at least in part, on the number of items currently in stock at one or more supply chain entities 180, the number of items currently in transit in transportation network 160, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity of one or more supply chain entities 180 in e-commerce system 100 and store and transport the product for a second supply chain entity of one or more supply chain entities 180. Such distribution centers may comprise automated warehousing systems that automatically transport to one or more retailers or customers and/or automatically remove an item from, or place an item into, inventory based, at least in part, on the number of items currently in stock at one or more supply chain entities 180, the number of items currently in transit in transportation network 160, a forecasted demand, a supply chain disruption, a material or capacity reallocation, current and projected inventory levels at one or more stocking locations, and/or one or more additional factors described herein. One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on the number of items currently in stock at one or more supply chain entities 180, the number of items currently in transit in transportation network 160, a forecasted demand, a supply chain disruption, a material or capacity reallocation, current and projected inventory levels at one or more stocking locations, and/or one or more additional factors described herein. Although one or more suppliers, manufacturers, distribution centers, and retailers are shown and described as separate and distinct entities, the same entity may simultaneously act as any one or more suppliers, manufacturers, distribution centers, and retailers. For example, one or more manufacturers acting as a manufacturer may produce a product, and the same entity may act as a supplier to supply a product to another supply chain entity of one or more supply chain entities 180. Although one example of e-commerce system 100 is shown and described, embodiments contemplate any configuration of e-commerce system 100, without departing from the scope of the present disclosure.

As shown in FIG. 1, e-commerce system 100 operates on one or more computers 190 that are integral to or separate from the hardware and/or software that support fusion interface system 110, machine learning system 120, archiving system 130, order management system 140, inventory system 150, transportation network 160, one or more sensing devices 170, and one or more supply chain entities 180. One or more computers 190 may include any suitable input device 192, such as a keypad, mouse, touch screen, microphone, or other device to input information. Output device 194 may convey information associated with the operation of e-commerce system 100, including digital or analog data, visual information, or audio information. One or more computers 190 may include fixed or removable computer-readable storage media, including a non-transitory computer readable medium, magnetic computer disks, flash drives, CD-ROM, in-memory device or other suitable media to receive output from and provide input to e-commerce system 100. One or more computers 190 may include one or more processors 196 and associated memory to execute instructions and manipulate information according to the operation of e-commerce system 100 and any of the methods described herein. In addition, or as an alternative, embodiments contemplate executing the instructions on one or more computers 190 that cause one or more computers 190 to perform functions of the methods. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

In addition, and as discussed herein, e-commerce system 100 may comprise a cloud-based computing system having processing and storage devices at one or more locations, local to, or remote from, fusion interface system 110, machine learning system 120, archiving system 130, order management system 140, inventory system 150, transportation network 160, one or more sensing devices 170, and one or more supply chain entities 180. In addition, each of one or more the computers 190 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with fusion interface system 110, machine learning system 120, archiving system 130, order management system 140, inventory system 150, and transportation network 160. In addition, or as an alternative, these one or more users within e-commerce system 100 may include, for example, one or more computers 190 programmed to autonomously handle, among other things, actions and/or one or more related tasks within e-commerce system 100.

In one embodiment, fusion interface system 110 may be coupled with network 198 using communication link 199*a*, which may be any wireline, wireless, or other link suitable to support data communications between fusion interface system 110 and network 198 during operation of e-commerce system 100. Machine learning system 120 may be coupled with network 198 using communication link 199*b*, which may be any wireline, wireless, or other link suitable to support data communications between machine learning system 120 and network 198 during operation of e-commerce system 100. Archiving system 130 may be coupled with network 198 using communication link 199c, which may be any wireline, wireless, or other link suitable to support data communications between archiving system 130 and network 198 during operation of e-commerce system 100. Order management system 140 may be coupled with network 198 using communication link 199d, which may be any wireline, wireless, or other link suitable to support data communications between order management system 140 and network 198 during operation of e-commerce system 100. Inventory system 150 may be coupled with network 198 using communication link 199e, which may be any wireline, wireless, or other link suitable to support data communications between inventory system 150 and network 198 during operation of e-commerce system 100. Transportation network 160 may be coupled with network 198 using communication link 199f, which may be any wireline, wireless, or other link suitable to support data communications between transportation network 160 and network 198 during operation of e-commerce system 100. One or more sensing devices 170 may be coupled with network 198 using communication link 199g, which may be any wireline, wireless, or other link suitable to support data communications between one or more sensing devices 170 and network 198 during operation of e-commerce system 100. One or more supply chain entities 180 may be coupled with network 198 using communication link 199h, which may be any wireline, wireless, or other link suitable to support data communications between one or more supply chain entities 180 and network 198 during operation of e-commerce system 100. One or more computers 190 may be coupled with network 198 using communication link 199i, which may be any wireline, wireless, or other link suitable to support data communications between one or more computers 190 and network 198 during operation of e-commerce system 100. Although communication links 199a-199i are shown as generally coupling fusion interface system 110, machine learning system 120, archiving system 130, order management system 140, inventory system 150, transportation network 160, one or more sensing devices 170, one or more supply chain entities 180, and one or more computers 190 to network 198, each of fusion interface system 110, machine learning system 120, archiving system 130, order management system 140, inventory system 150, transportation network 160, one or more sensing devices 170, one or more supply chain entities 180, and one or more computers 190 may communicate directly with each other, according to particular needs.

In another embodiment, network 198 includes the Internet and any appropriate local area networks (LANs), metropolitan area networks (MANs), or wide area networks (WANs) coupling fusion interface system 110, machine learning system 120, archiving system 130, order management system 140, inventory system 150, transportation network 160, one or more sensing devices 170, one or more supply chain entities 180, and one or more computers 190. For example, data may be maintained locally to, or externally of, fusion interface system 110, machine learning system 120, archiving system 130, order management system 140, inventory system 150, transportation network 160, one or more sensing devices 170, one or more supply chain entities 180, and one or more computers 190 and made available to one or more associated users of fusion interface system 110, machine learning system 120, archiving system 130, order management system 140, inventory system 150, transportation network 160, one or more sensing devices 170, one or more supply chain entities 180, and one or more computers 190 using network 198 or in any other appropriate manner. For example, data may be maintained in a cloud database at one or more locations external to fusion interface system 110, machine learning system 120, archiving system 130, order management system 140, inventory system 150, transportation network 160, one or more sensing devices 170, one or more supply chain entities 180, and one or more computers 190 and made available to one or more associated users of fusion interface system 110, machine learning system 120, archiving system 130, order management system 140, inventory system 150, transportation network 160, one or more sensing devices 170, one or more supply chain entities 180, and one or more computers 190 using the cloud or in any other appropriate manner. Those skilled in the art will recognize that the complete structure and operation of network 198 and other components within e-commerce system 100 are not depicted or described. Embodiments may be employed in conjunction with known communications networks and other components.

In accordance with the principles of embodiments described herein, order management system 140 may place product orders at various manufacturers and/or distribution centers and determines products to be carried at various retailers. Additionally, or in the alternative, order management system 140 may generate a buy quantity for the inventory of one or more supply chain entities 180 in e-commerce system 100. Furthermore, order management system 140, inventory system 150, and/or transportation network 160 may instruct automated machinery (i.e., robotic warehouse systems, robotic inventory systems, automated guided vehicles, mobile racking units, automated robotic production machinery, robotic devices, and the like) to adjust product mix ratios, inventory levels at various stocking points, production of products of manufacturing equipment, proportional or alternative sourcing of one or more supply chain entities 180, and the configuration and quantity of packaging and shipping of products based, at least in part on, and in response to, orders and/or current inventory or production levels. For example, according to embodiments, order management system 140 orders a purchase quantity for one or more products, which may be used in combination with inventory policies or target service levels, to signify when the inventory quantity of an item reaches a particular level and may need to be resupplied. Therefore, when the inventory of an item falls to a certain level, order management system 140 may initiate one or more processes that then automatically adjusts product mix ratios, inventory levels, production of products of manufacturing equipment, and proportional or alternative sourcing of one or more supply chain entities 180 until the inventory is resupplied to a target level.

The methods described herein may include one or more computers 190 receiving product data 282 from automated machinery having at least one sensor and product data 282 corresponding to an item detected by the automated machinery. Received product data 282 may include an image of the item, an identifier, as described above, and/or other data associated with the item (dimensions, texture, estimated weight, and any other like data). The methods may further include one or more computers 190 looking up received product data 282 in a database system associated with order management system 140, inventory system 150, and/or transportation network 160 to identify the item corresponding to product data 282 received from the automated machinery. Based on the identification of the item, one or more computers 190 may also identify (or alternatively generate) a first mapping in the database system, where the first mapping is associated with the current location of the identified item, and a second mapping in the database system, where the second mapping is associated with a past location of the identified item, and then compare the first mapping and the second mapping to determine whether the current location of the identified item in the first mapping is different than the past location of the identified item in the second mapping. One or more computers 190 may send instructions to the automated machinery based, as least in part, on one or more differences between the first mapping and the second mapping such as, for example, to locate items to add to or remove from an inventory of or shipment to fulfill one or more orders. In addition, or as an alternative, order management system 140 monitors one or more supply chain constraints of one or more items at one or more supply chain entities 180 and adjusts the orders and/or inventory of one or more supply chain entities 180 at least partially based on the one or more supply chain constraints.

Figure 2:
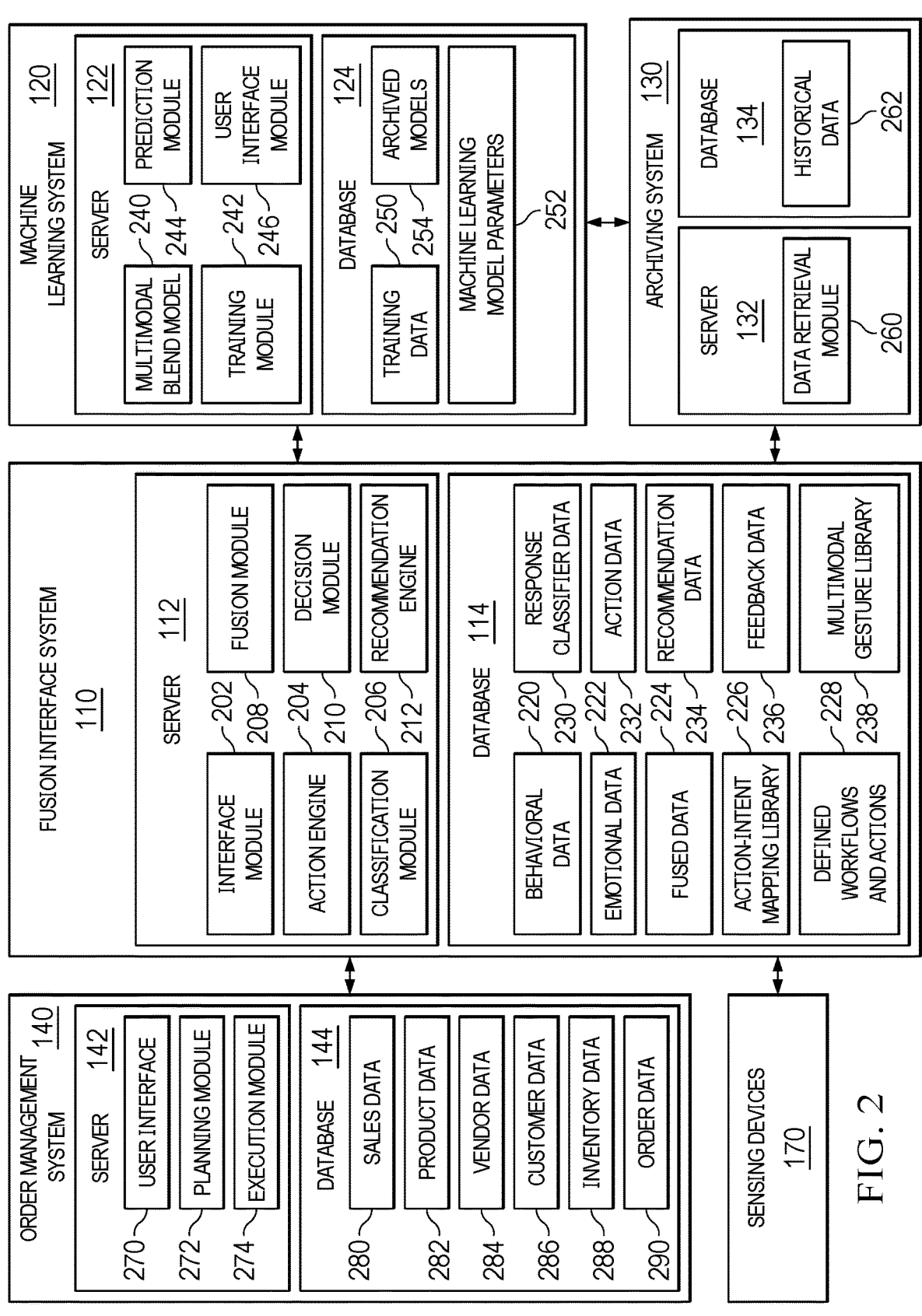
FIG. 2 illustrates the fusion interface system, the machine learning system, the archiving system, the order management system, and the one or more sensing devices of FIG. 1 in greater detail, in accordance with an embodiment.

FIG. 2 illustrates fusion interface system 110, machine learning system 120, archiving system 130, order management system 140, and one or more sensing devices 170 of FIG. 1 in greater detail, in accordance with an embodiment.

Fusion interface system 110 comprises server 112 and database 114, as disclosed above. Although fusion interface system 110 is shown as comprising a single server 112 and a single database 114, embodiments contemplate any suitable number of servers or databases internal to, or externally coupled with, fusion interface system 110, according to particular needs. According to embodiments, server 112 comprises interface module 202, action engine 204, classification module 206, fusion module 208, decision module 210, and recommendation engine 212. Although server 112 of fusion interface system 110 is shown as comprising interface module 202, action engine 204, classification module 206, fusion module 208, decision module 210, and recommendation engine 212, embodiments contemplate any suitable number or combination of these located at one or more locations internal to, or externally coupled with, fusion interface system 110, according to particular needs.

According to embodiments, interface module 202 comprises an input and sensor interface that monitors any combination of one or more modes of user interaction and input, including, for example, a mouse, a keyboard, a touchscreen, cursor, display device, voice commands, eye movement and position, facial features and movements, gestures, BCI, and the like, to monitor user actions, inputs, emotions, and behavior. Interface module 202 may further monitor the user environment (e.g., dashboard, list, detail, situation, CDT, and the like) and the user intent/motivation (e.g., decision, compare, drill in, filter, navigate, and the like). According to embodiments, user inputs and interactions may comprise focus prompts which monitor cursor position, eye cornea reflection tracking, active tab position, and the like. In addition, or as an alternative, the user input and interactions may comprise action prompts which may comprise BCI or emotional inputs that indicate mental state regulation (close to "HOLD"), movement imagery (close to "MOVE"), and evoked response generation (close to "CLICK"), as well as voice utterances, facial expression and sentiments, keyboard input, and the like.

Interface module 202 may be coupled with one or more sensing devices 170 and/or the one or more input devices using one or more communication links, which may be any wireline, wireless, or other link suitable to support data communications between or among interface module 202 (and/or any input monitoring processing devices), one or more sensing devices 170, one or more input devices, and network 198 during operation of e-commerce system 100. For example, the input and sensor interface of interface module 202 may comprise an engine and/or processor that communicates over one or more communication links to send and receive data from one or more sensing devices 170 to monitor eyes, face, head, hands, voice commands, brain signals, and the like of a user. The input and sensor interface may further communicate over one or more communication links to send and receive data associated with user inputs from one or more tactile input devices (e.g., mouse, keyboard, touchscreen, and the like). In addition, interface module 202 users one or more sensing devices 170 to monitor actions (or inactions) taken by a user as well as emotional data 222 and behavioral data 220 of the user, which is then compared with one or more possible or predicted actions that may be used to update one or more matrix tensors.

According to embodiments, action engine 204 selects and displays one or more recommended actions for e-commerce system 100 and may automatically initiate the action or task, as described in further detail below. Classification module 206 of fusion interface system 110 classifies one or more possible actions or tasks based on a machine learning model, such as, for example, multimodal blend model 240, as described in further detail below. Fusion module 208 performs data fusion on behavioral data 220, emotional data 222, and/or other data received from interface module 202, as described in further detail below. In embodiments, decision module 210 generates statistical features or decision features from captured and extracted features. Decision module 210 may further formulate one or more matrix tensors to build a machine learning model, such as multimodal blend model 240.

Recommendation engine 212 generates a response score and one or more attribute-based recommendations utilizing user interactions such as, for example, BCI and facial expressions. In embodiments, recommendation engine 212 may use the response score to propose actions or alternative recommendations for product attributes and decision-making processes, such as, for example, recommending a product or service in commerce, suggesting a substitute product or service, and other like integrations of the user environment with response classifiers.

Database 114 of fusion interface system 110 comprises one or more databases or other data storage arrangements at one or more locations, local to, or remote from, fusion interface system 110. Database 114 may comprise, for example, behavioral data 220, emotional data 222, fused data 224, action-intent mapping library 226, defined workflows and actions 228, response classifier data 230, action data 232, recommendation data 234, feedback data 236, and multimodal gesture library 238. Although database 114 is illustrated and described as comprising behavioral data 220, emotional data 222, fused data 224, action-intent mapping library 226, defined workflows and actions 228, response classifier data 230, action data 232, recommendation data 234, feedback data 236, and multimodal gesture library 238, embodiments contemplate any suitable number or combination of these, located at one or more locations, local to, or remote from, fusion interface system 110, according to particular needs.

According to embodiments, behavioral data 220 of fusion interface system 110 comprises various behaviors of a user corresponding to various interactions or activities of the user monitored by interface module 202. Emotional data 222 of fusion interface system 110 comprises various emotions of a user corresponding to various interactions or activities of the user monitored by interface module 202. Fused data 224 of fusion interface system 110 comprises a fusion of the user interaction and input signals from interface module 202. In one embodiment, fused data 224 comprises features from different signals, which are then used by fusion module 208 to generate decision features. Action-intent mapping library 226 of fusion interface system 110 is a repository for multimodal interaction, which is mapped and reinforced based on monitoring user interaction with e-commerce system 100 to determine emotions, expressions, motions, tones, and the like.

Defined workflows and actions 228 of fusion interface system 110 comprise one or more decision trees that describe the workflows, tasks, and actions based on a particular user environment, such as, for example, the displayed information of an application of e-commerce system 100, the displayed graphical element or product attribute being focused on by the user, and the like. Response classifier data 230 predicts or classifies the response of a user based on a machine learning model, such as multimodal blend model 240 of machine learning system 120. Action data 232 comprises the output of the response classifier merged or combined with a social effect, as described in further detail below. According to embodiments, action module 204 generates action data 232 comprising a suggested action for a user. Recommendation data 234 comprises the response score, proposed actions, and/or recommendations corresponding to e-commerce system 100 and decision-making processes. According to embodiments, feedback data 236 comprises the data received by interface module 202 during monitoring of the actions (or inactions) taken by the user of e-commerce system 100, as well as emotional data 222 and behavioral data 220 of the user during presentation of the one or more possible or predicted actions.

Multimodal gesture library 238 comprises an action repository for multimodal interaction that is mapped and reinforced based on user experience with e-commerce system 100 over time, and which indicates how different signals are connected and their meanings, which is then used by a reinforcement learning model to generated predicted actions and recommendations.

Machine learning system 120 comprises server 122 and database 124, as disclosed above. Although machine learning system 120 is shown as comprising a single server 122 and a single database 124, embodiments contemplate any suitable number of servers or databases internal to, or externally coupled with, machine learning system 120.

Server 122 of machine learning system 120 comprises multimodal blend model 240, training module 242, prediction module 244, and user interface module 246. Although server 122 is shown and described as comprising a single multimodal blend model 240, a single training module 242, a single prediction module 244, and a single user interface module 246, embodiments contemplate any suitable number or combination of these, located at one or more locations, local to, or remote from, machine learning system 120, such as on multiple servers or computers 190 at one or more locations in e-commerce system 100.

Database 124 of machine learning system 120 may comprise one or more databases or other data storage arrangement at one or more locations, local to, or remote from, server 122. Database 124 of machine learning system 120 comprises, for example, training data 250, machine learning model parameters 252, and archived models 254. Although database 124 of machine learning system 120 is shown and described as comprising training data 250, machine learning model parameters 252, and archived models 254, embodiments contemplate any suitable number or combination of data, located at one or more locations, local to, or remote from, machine learning system 120, according to particular needs.

According to embodiments, multimodal blend model 240 comprises a machine learning model trained by training module 242 to perform multimodal blending of a variety of input sources. As described in further detail below, multimodal blend model 240 may combine various input features, including low-level and high-level input features, to generate fused input data, which may then be used by fusion interface system 110 to generate one or more recommended actions to suggest to a user based on the input provided to multimodal blend model 240. Training module 242 receives instances of training data 250 and trains multimodal blend model 240 using, for example, a reinforcement training model. According to this embodiment, training module 242 trains multimodal blend model 240 to determine a user intent and generate predictions and recommendations. Various machine learning models may be used, such as for example, an Artificial Neural Network (ANN) trained using deep learning.

Prediction module 244 of machine learning system 120 generates predictions comprising the response classifiers from one or more machine learning models. User interface module 246 of machine learning system 120 generates and displays a GUI, having one or more interactive visualizations for training multimodal blend model 240 and selecting one or more machine learning techniques to learn machine learning model parameters 252. According to embodiments, user interface module 246 displays a GUI comprising interactive graphical elements for selecting and modifying training data 250, machine learning model parameters 252, archived models 254, and the like.

Training data 250 comprises data used by training module 242 to perform reinforcement training on multimodal blend model 240. For example, training data 250 may comprise user responses to suggested actions detected by interface module 202 of fusion interface system 110. Machine learning model parameters 252 comprise weights, connections, hierarchies, selected number of layers, or any other machine learning model parameter. Archived models 254 comprise previously-trained machine learning models, which may be retrieved by fusion interface system 110 to generate predictions and recommendations.

As disclosed above, archiving system 130 comprises server 132 and database 134. Although archiving system 130 is shown as comprising a single server 132 and a single database 134, embodiments contemplate any suitable number of servers or databases internal to, or externally coupled with, archiving system 130.

Server 132 of archiving system 130 comprises data retrieval module 260. Although server 132 is shown and described as comprising a single data retrieval module 260, embodiments contemplate any suitable number or combination of data retrieval modules located at one or more locations, local to, or remote from, archiving system 130, such as on multiple servers or computers 190 at one or more locations in e-commerce system 100.

In one embodiment, data retrieval module 260 of archiving system 130 receives historical data 262 from fusion interface system 110, order management system 140, inventory system 150, transportation network 160, and/or the one or more sensing devices 170 and stores received historical data 262 in database 134. According to one embodiment, data retrieval module 260 may prepare historical data 262 for use by machine learning system 120 by checking historical data 262 for errors and transforming historical data 262 to normalize, aggregate, and/or rescale historical data 262 to allow direct comparison of other data received from fusion interface system 110, order management system 140, inventory system 150, transportation network 160, and/or one or more sensing devices 170. According to embodiments, data retrieval module 260 receives data from one or more sources external to e-commerce system 100, such as, for example, user profiles, weather data, social media data, user and event calendars, and the like and stores the received data as historical data 262.

Database 134 of archiving system 130 may comprise one or more databases or other data storage arrangement at one or more locations, local to, or remote from, server 132. Database 134 of archiving system 130 comprises, for example, historical data 262. Although database 134 of archiving system 130 is shown and described as comprising historical data 262, embodiments contemplate any suitable number or combination of data, located at one or more locations, local to, or remote from, archiving system 130, according to particular needs.

Historical data 262 comprises data received from fusion interface system 110, order management system 140, inventory system 150, transportation network 160, one or more sensing devices 170, one or more computers 190, and/or one or more locations local to, or remote from, e-commerce system 100, such as, for example, one or more sources for user profiles, special events, social media, calendars, and the like. In an embodiment, historical data 262 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

Order management system 140 comprises server 142 and database 144, as disclosed above. Although order management system 140 is shown as comprising a single server 142 and a single database 144, embodiments contemplate any suitable number of servers or databases internal to, or externally coupled with, order management system 140. According to one embodiment, server 142 comprises user interface 270, planning module 272, and execution module 274. Although server 142 is shown and described as comprising a single user interface 270, a single planning module 272, and a single execution module 274, embodiments contemplate any suitable number or combination of these located at one or more locations local to, or remote from, order management system 140, such as one or more servers or computers 190 at one or more other locations in e-commerce system 100.

Database 144 of order management system 140 may comprise one or more databases or other data storage arrangements at one or more locations, local to, or remote from, server 142. Database 144 comprises, for example, sales data 280, product data 282, vendor data 284, customer data 286, inventory data 288, and order data 290. Although, database 144 is shown and described as comprising sales data 280, product data 282, vendor data 284, customer data 286, inventory data 288, and order data 290, embodiments contemplate any suitable number or combination of these, located at one or more locations, local to, or remote from, order management system 140, according to particular needs.

User interface 270 generates a graphical user interface for selecting, visualizing, modifying, saving, and/or deleting one or more of sales data 280, product data 282, vendor data 284, customer data 286, inventory data 288, and order data 290. User interface 270 displays data and interactive visual elements for selecting and configuring product data 282 organized and sortable by any measure, value, or dimension, including, for example, product attributes, attribute values, product identification, sales quantity, demand forecast, or any stored value, measure, or dimension. In addition, user interface 270 provides interactive graphical elements comprising selectable elements that, in response to a user selection, initiate a predetermined action, such as, for example, displaying and navigating products, selecting various attributes for the products, initiating orders, payment processing, and initiating returns or refunds. User interface 270 displays data and interactive visual elements for selecting and configuring the products to be offered for sale by e-commerce system 100. Planning module 272 and/or execution module 274 of order management system 140 may comprise one or more of, for example, a product description module that enables input and display of product data 282, an inventory module, a purchasing and receiving module, a customer management module, an ordering module, a billing module, an order processing module, and other modules for planning and/or executing various tasks of one or more workflows of order management system 140, according to particular needs.

Sales data 280 of database 144 may comprise recorded sales and returns transactions and related data, including, for example, a transaction identification, time and date stamp, channel identification, such as stores or online touch-points, product identification, actual cost, selling price, sales quantity, customer identification, promotions, and or the like. In addition, sales data 280 may be represented by any suitable combination of values and dimensions, aggregated or unaggregated, such as, for example, sales per week, sales per week per location, sales per day, sales per day per season, or the like.

Product data 282 of database 144 may comprise one or more data structures comprising products identified by, for example, a product identifier (such as a Stock Keeping Unit (SKU), Universal Product Code (UPC), or the like) and one or more attributes and attribute types associated with the product ID. Product data 282 may comprise any attributes of one or more products organized according to any suitable database structure, and sorted by, for example, attribute type, attribute, value, product identification, or any suitable categorization or dimension. Attributes of one or more items may be, for example, any categorical characteristic or quality of an item, and an attribute value may be a specific value or identity for the one or more items according to the categorical characteristic or quality. According to other embodiments, product data 282 considers shelf-life of perishable goods (which may range from days (e.g., fresh fish or meat) to weeks (e.g., butter) or even months, before any unsold items have to be written off as waste) as well as influences from promotions, price changes, rebates, coupons, and even cannibalization effects among products.

Vendor data 284 of database 144 may comprise data describing the vendors of e-commerce system 100, as well as one or more retailers and related store information. Vendor data 284 may comprise, for example, a vendor ID, a vendor description, vendor profiles, vendor location details, vendor type, lead times, offered products, and other like data. According to embodiments, vendor profiles comprise the identity of one or more vendors which may be used to allocate products targeted to the customer preferences.

Customer data 286 may comprise customer identity information, including, for example, customer relationship management data, loyalty programs, and mappings between product purchases and one or more customers so that the customer associated with a sale may be analyzed. Customer data 286 may include one or more customer preferences segments grouped according to one or more customer profiles comprising characteristics, such as goals, motivations, or preferences. Each customer profile may also be identified by assigning a name and image to the segment. The customer profiles may be used to analyze, sort, and understand supply chain data and generate product assortments.

Inventory data 288 of database 144 may comprise any data relating to current or projected inventory quantities or states, order rules, or the like. For example, inventory data 288 may comprise the current level of inventory for each item at one or more stocking points at one or more retailers, one or more distribution centers, or any other supply chain entity of one or more supply chain entities 180 across e-commerce system 100. In addition, inventory data 288 may comprise order rules that describe one or more rules or limits on setting an inventory policy, including, but not limited to, a minimum order quantity, a maximum order quantity, a discount, and a step-size order quantity, and batch quantity rules. According to some embodiments, order management system 140 accesses and stores inventory data 288 in database 144 of order management system 140 and/or database of inventory system 150, which may be used by order management system 140 to place orders, set inventory levels at one or more stocking points, initiate manufacturing of one or more components, or the like. In addition, or as an alternative, inventory data 288 may be updated by receiving current item quantities, mappings, or locations from inventory system 150 and/or transportation network 160. According to one embodiment, inventory data 288 includes inventory policies. Inventory policies may, for example, describe the reorder point and target quantity, or other inventory policy parameters that set rules for order management system 140, inventory system 150, and transportation network 160 to manage and reorder inventory. These inventory policies may be based on target service level, demand, cost, fill rate, or the like. Order management system 140 may determine inventory policies that comprise target service levels that ensure that a service level of one or more stores of the one or more retailers is met with a certain probability. For example, one or more retailers and/or one or more distribution centers may set a service level at 95%, meaning the one or more retailers and/or the one or more distribution centers sets the desired inventory stock level at a level that meets demand of the one or more stores 95% of the time. Although, a particular service level target and percentage is described, embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level.

As described in further detail below, order management system 140 generates order data 290 for one or more products. By way of example only and not by way of limitation, order data 290 comprises a request received by order management system 140 to order one or more items, a price and attributes of the one or more ordered items, a generated order, promise of the one or more ordered items from inventory or from one or more vendors, tracking of the one or more ordered items, and other data for processing the transport of the one or more ordered items from its origin to the destination.

Figure 3:
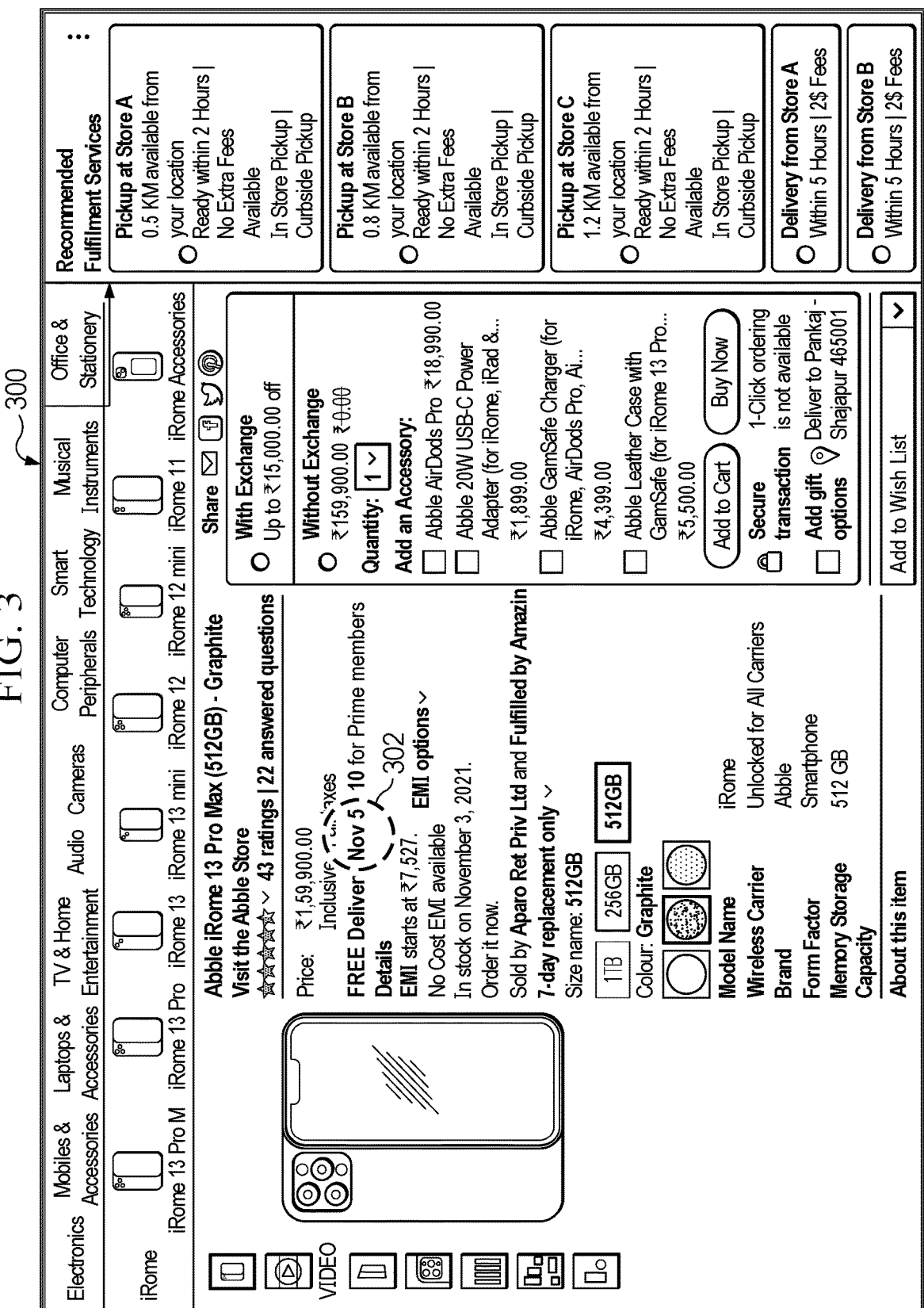
FIG. 3 illustrates an example interface of the order management system user interface, in accordance with an embodiment.

FIG. 3 illustrates example interface 300 of order management system 140 user interface 270, in accordance with an embodiment. By way of example only and not by way of limitation, order management system 140 provides an internet-based e-commerce platform for purchasing retail products. In this example, order management system 140 provides for purchasing a smartphone with various attributes such as, for example, color, size, storage capacity, model, and the like. The focus of the user is illustrated by gaze indicator 302 indicating where one or more sensing devices 170 are detecting the focus of the user. As described in greater detail below, eye tracking and facial imaging interface 800 (FIG. 8) detects the user sentiment associated with the focus of the user and the attributes that are displayed by order management system 140 user interface 270 to determine the user sentiment associated with the displayed attribute. Continuing with the illustrated example, fusion interface system 110 determines that the user is happy while browsing and selecting a product (here, a smartphone), but detects that when the focus is on the delivery date attribute, the sentiment of the user becomes negative. Based on the detected negative attribute associated with the focused attribute, fusion interface system 110 provides recommendations that are predicted to overcome the negative sentiment attribute. In this example, the negative attribute is associated with a delivery date, so fusion interface system 110 accordingly searches for alternative transportation methods (fulfillment services) or alternative similar products that may provide the requested product or a similar product at a sooner time period. Other recommendations may include providing a pickup from a retail location, pickup from a different location, delivery on a weekend, delivery from a store, and the like, as well as any additional information, such as, an updated delivery time, an extra or reduced cost, and the like. Although the previous example is given for an attribute comprising a delivery date, embodiments contemplate recommending substitute items comprising any detected emotional response to an attribute which may include, for example, color, style, design, brand, and the like.

Figure 4:
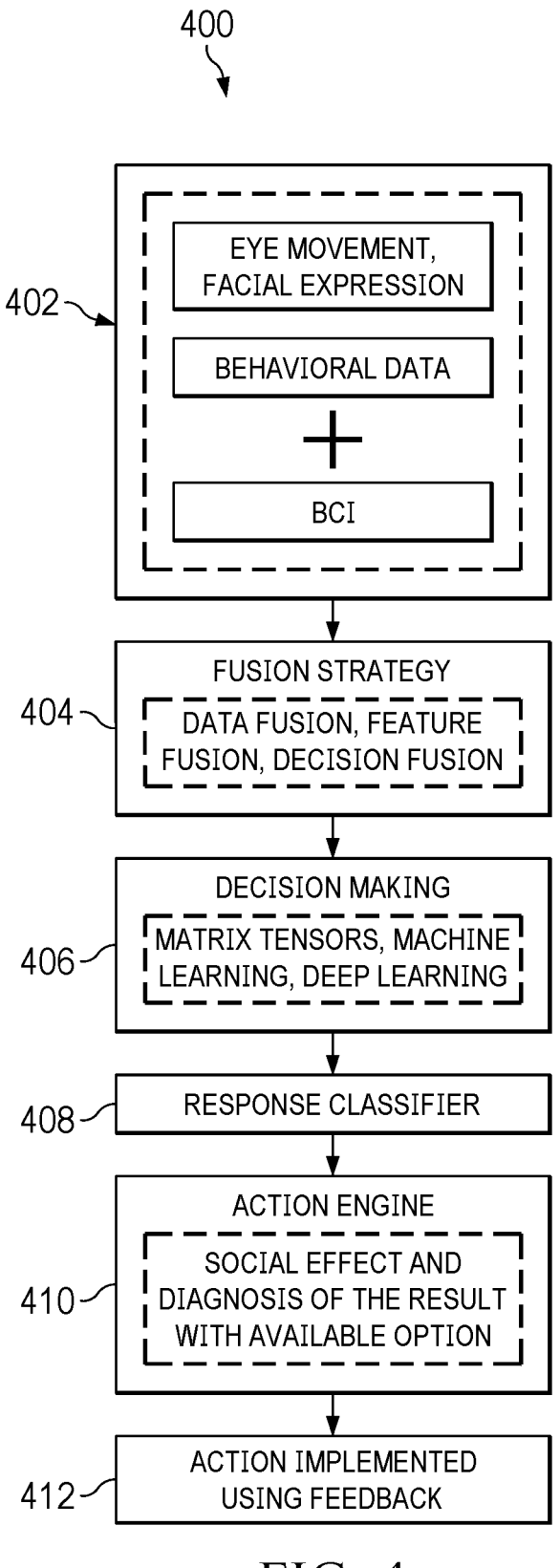
FIG. 4 illustrates a method of multimodal fusion, in accordance with an embodiment.

FIG. 4 illustrates method 400 of multimodal fusion, in accordance with an embodiment. Method 400 may be performed by a fusion interface system, such as fusion interface system 110 of FIG. 1. Method 400 comprises one or more activities, which although described in a particular order, may be performed in one or more permutations, according to particular needs. Method 400 of multimodal fusion identifies a next set of actions that a user is expected to perform, such as, for example, by identifying whether the response is that the user likes or does not like an item displayed by user interface 270 of e-commerce platform 100. As discussed herein, the identification of the user response may comprise a fusion of BCI input and facial feature detection to indicate an emotional state of the user, as well as determining an intent of the user by analyzing the gaze or cursor using machine learning to predict or recommend an action or item based on the response of the user.

At activity 402, interface module 202 of fusion interface system 110 receives user interaction and input data. According to embodiments, the user interaction and input signals may comprise, for example, VUI, BCI, facial expressions, eye movements, mouse and keyboard input, and/or behavioral data 220. By way of example only and not by way of limitation, the illustrated embodiment captures eye movement (which provides, among other things, statistical features, as described in further detail below) and facial expressions, as well as behavioral data 220 and BCI signals.

At activity 404, fusion module 208 of fusion interface system 110 fuses the user interaction and input signals from interface module 202. According to an embodiment, fusion module 208 fuses the eye movement and facial expression data with the BCI signals and behavioral data 220 to generate fused data 224. Fused data 224 comprises features from the different signals, which fusion module 208 may then use to generate decision features. Using the fusion of BCI signals, screen gaze, and emotional sentiments, fusion interface system 110 may initiate dynamic data changes and/or one or more actions. As disclosed in further detail below, fusion interface system 110 may generate a response score, which, in some embodiments, is combined with user environmental variables received from the combinations of BCI and facial expressions and used to generate attribute-based recommendations.

At activity 406, decision module 210 of fusion interface system 110 uses the decision features to create one or more matrix tensors. According to embodiments, machine learning system 120 uses the one or more matrix tensors along with machine learning and/or deep learning to build a machine learning model, such as, for example, multimodal blend model 240, as disclosed above. At activity 408, classification module 206 of fusion interface system 110 generates a response classifier. According to an embodiment, classification module 206 uses the machine learning model to generate the response classifier, which predicts or classifies the response of a user.

At activity 410, decision module 210 of fusion interface system 110 passes the response classifier to action engine 204 of fusion interface system 110, where action engine 204 merges or combines the response classifier with a social effect. According to embodiments, the social effect is the diagnosis of previous results in a similar context, such as, for example, historical data 262 and/or multimodal gesture library 238. For example, when the user has a positive response (the response classifier) upon viewing a graphical element on a GUI of a particular application, at activity 410, action engine 204 may associate that when the user has previously had a positive response upon viewing a graphical element on a GUI of the same application, the user has drilled down on the graphical element to view attributes associated with the graphical element (the social effect). At activity 412, action engine 204 uses the response from the social effect (the diagnosis of previous results in a similar context) and the diagnosis of the current result to generate one or more actions to suggest to the user. Continuing with the previous example, at activity 412, action engine 204 may suggest drilling down on the graphical element that evokes the positive response from the user to view attributes associated with the graphical element. After activity 412, embodiments contemplate that multimodal blend model 240 may learn and adapt to behavior and preferences of the user using reinforcement training via training module 242.

FIG. 5 illustrates method 500 of multimodal blend modeling, in accordance with an embodiment. Method 500 may be performed by a fusion interface system, such as fusion interface system 110 of FIG. 1. Method 500 comprises one or more activities, which although described in a particular order, may be performed in one or more permutations, according to particular needs.

At activity 502, interface module 202 of fusion interface system 110 monitors eye movement and facial expression of a user. In embodiments, interface module 202 may monitor eye movement and facial expression with one or more sensors 176 using image-based techniques, such as example-based learning. Interface module 202 may use feature analysis, active shape models, and the like to capture low level features from the eye movement and facial expression. At activity 504, fusion module 208 of fusion interface system 110 extracts and fuses features captured at activity 502. For example, fusion module 208 extracts geometrical and textual features such as, for example, Gabor wavelet, local binary patterns, movement of the brow, movement of eyelids, movement of cheeks, movement of the nose, movement of the nasolabial fold, movement of the lips, movement of the chin, movement of the mouth, and the like.

At activity 506, decision module 210 of fusion interface system 110 generates statistical features (which may be referred to as decision features), which may comprise, but are not limited to, blink frequency, fixation frequency, saccade frequency, fixation dispersion total, fixation dispersion maximum, average saccade duration, average saccade amplitude, average saccade latency, amplitude of eye movement, and the like. Upon fusion, decision module 210 converts the decision features into a matrix tensor. At activity 508, classification module 206 of fusion interface system 110 builds a response classifier to predict a user response. According to embodiments, classification module 206 generates the response classifier by superimposing the matrix tensor generated at activity 506 with one or more social effects and/or historical data 262. According to embodiments, the response classifier may comprise a basic expression (e.g., happy, sad, contemptuous, etc.), as well as a compound expression (e.g., complex expression, abnormal expression, micro expression, etc.) corresponding to the response predicted for the user. Using the response classifier, recommendation engine 212 of fusion interface system 110 may generate one or more suggested actions for the user.

FIG. 6 illustrates method 600 of action recommendation based on BCI signals, in accordance with an embodiment. Method 600 may be performed by a fusion interface system, such as fusion interface system 110 of FIG. 1. Method 600 comprises one or more activities, which although described in a particular order may be performed in one or more permutations, according to particular needs.

At activity 602, interface module 202 of fusion interface system 110 collects attributes of a displayed item at different levels (e.g., color, price, size, etc.) and tracks the focus and emotional state of a user. At activity 604, recommendation engine 212 of fusion interface system 110 calculates action-based similarity. Based on the action-based similarity, at activity 606, recommendation engine 212 generates a recommendation score of action similarity. At activity 608, recommendation engine 212 applies collaborative filtering on user-user similarity. Based on the collaborative filtering of user-user similarity, at activity 610, recommendation engine 212 identifies or predicts a most similar user to the current user. Using a response classifier, which in embodiments may be determined based on method 500 of FIG. 5, recommendation engine 212 combines the action similarity score generated at activity 606 and the user-user similarity generated at activity 610 and superimposes the response classifier to generate a combined adaptive weighting scheme at activity 612. According to an embodiment, recommendation engine 212 uses the combined adaptive weighting scheme to identify the top n suggested actions the user is expected to perform at activity 614. By way of example only and not by way of limitation, recommendation engine 212 may determine that the user is selecting an item from an array of items, but a particular attribute of the item is unliked by the user. Continuing this example, fusion interface system 110 determines that the user likes the particular item displayed on an output device associated with e-commerce system 100 (such as, for example, user interface 270 of order management system 140), but the user does not like the color of the item. Recommendation engine 212 determines the top n actions that the user is expected to perform in this particular environment by utilizing the input from the response classifier combined with the environmental variables and the historical information. In this way, recommendation engine 212 identifies and recommends the top n actions or items that the user is expected to perform. Additional examples of recommendation engine 212 are provided below with FIG. 11.

Figure 7:
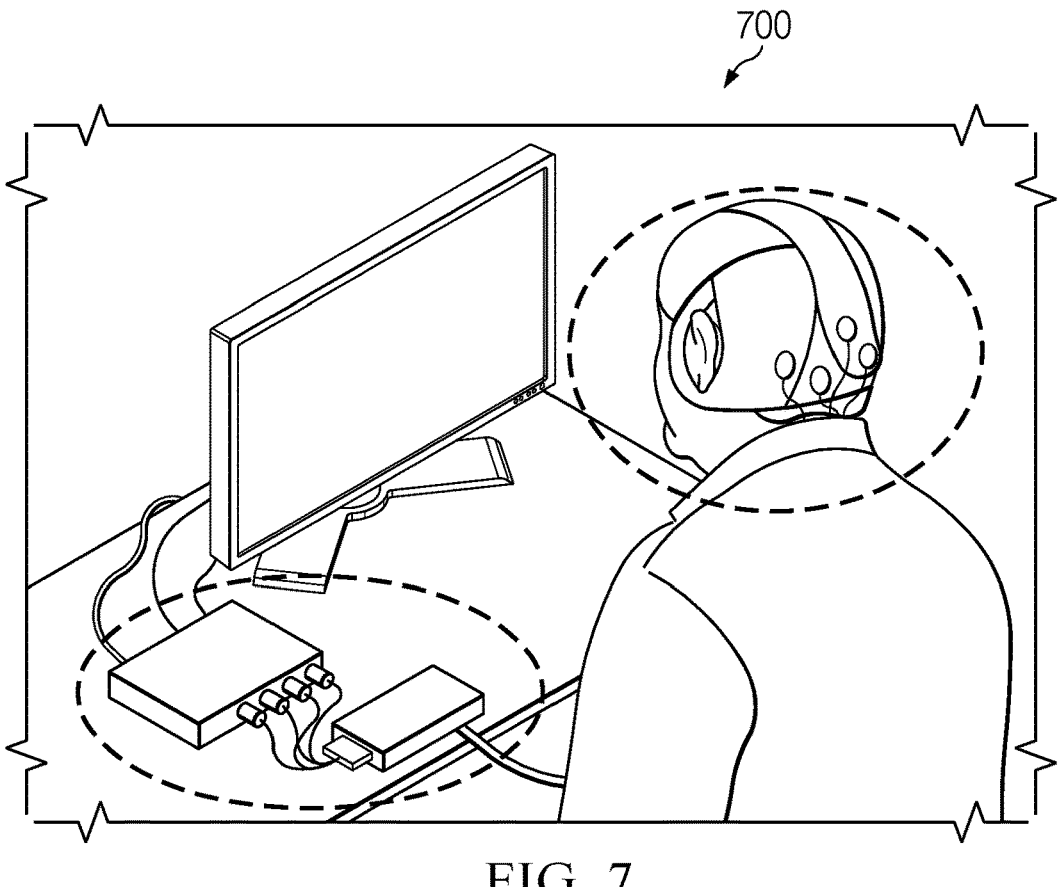
FIG. 7 illustrates an example brain-computer interface of the e-commerce system, in accordance with an embodiment.

FIG. 7 illustrates example BCI 700 of e-commerce system 100, in accordance with an embodiment. According to embodiments, BCI 700 provides an assistive and adaptive user interface to provide multitasking and efficient navigation and performing actions without the use of any physical device such as keyboard and mouse, which may be especially useful for screens which require heavy visual interaction. In addition, or as an alternative, BCI 700 provides accessibility to applications for users with motor control disabilities. When coupled with e-commerce system 100, BCI 700 provides attribute changes to displayed items, data manipulation (cut/copy, past, drag and drop, etc.), visual content filtering and approval, segmentation of data, and the like.

Figure 8:
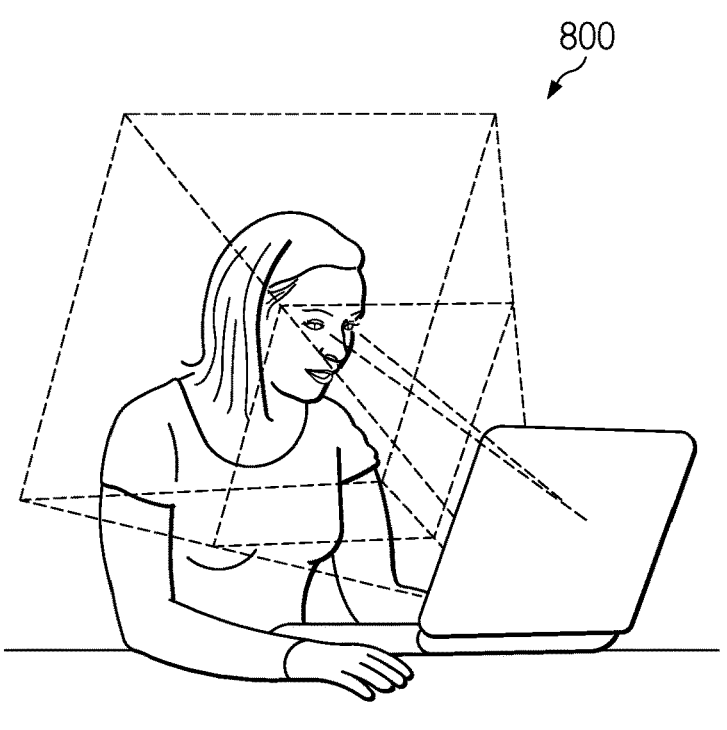
FIG. 8 illustrates an example eye tracking and facial imaging interface of the e-commerce system, in accordance with an embodiment.

FIG. 8 illustrates example eye tracking and facial imaging interface 800 of e-commerce system 100, in accordance with an embodiment. Eye tracking and facial recognition interface 800 may comprise an imaging sensor or camera that detects photons that are transformed by an imaging processor to generate a digital representation of an image. According to embodiments, the imaging sensor or camera may identify the location, position, and/or movement of a face and eyes of a user to identify and/or predict expressions, moods, gaze, and the like. Eye tracking may provide for drilling down on products to view attributes, zooming into plans for better visibility, and automatic and/or lazy scrolling of display information. In embodiments, by monitoring the gaze of a user through eye movements and/or positions, fusion interface system 110 identifies an item in the gaze of the user and evokes that object to drill down into attributes or substitutable items, zooming in on a hierarchy for better visibility, and scrolling through lists automatically when detecting that the gaze is near the last displayed object on the list. As disclosed above, fusion module 208 extracts features from the eye movement and facial expressions comprising extracted geometrical and textual features as well as saccade frequencies, dispersions, amplitude of the movement, blink frequency of eyes, fixation frequency of eyes, and the like which may be used to determine facial expressions, mood, emotions, focus, and the like. In addition, or as an alternative, embodiments contemplate using facial recognition to automatically recognize users and mapping or tagging monitored interface data, behavioral data 220, and emotional data 222 with particular users.

FIG. 9 illustrates comparison chart 900 showing total response time 904, error rate 906, and motion dependency 908 for various interface types 902, in accordance with an embodiment. In this illustration, interface types 902 include mouse, keyboard, gesture/expression, VUI, and BCI. Total response time 904 for each interface type 902 may vary from reaction time of a participant while the information transfer rate and feedback update interval are generally constant across all interface types 902. According to comparison chart 900, interface types 902 of mouse and keyboard have slower total response time 904 with lower error rate 906 values, while gesture/expression, BCI, and VUI have significantly quicker total response time 904 but higher error rate 906 values. Embodiments utilize multimodal blend model 240 for multiple interfaces to reduce error rate 906 and decrease total response time 904.

Figure 10:
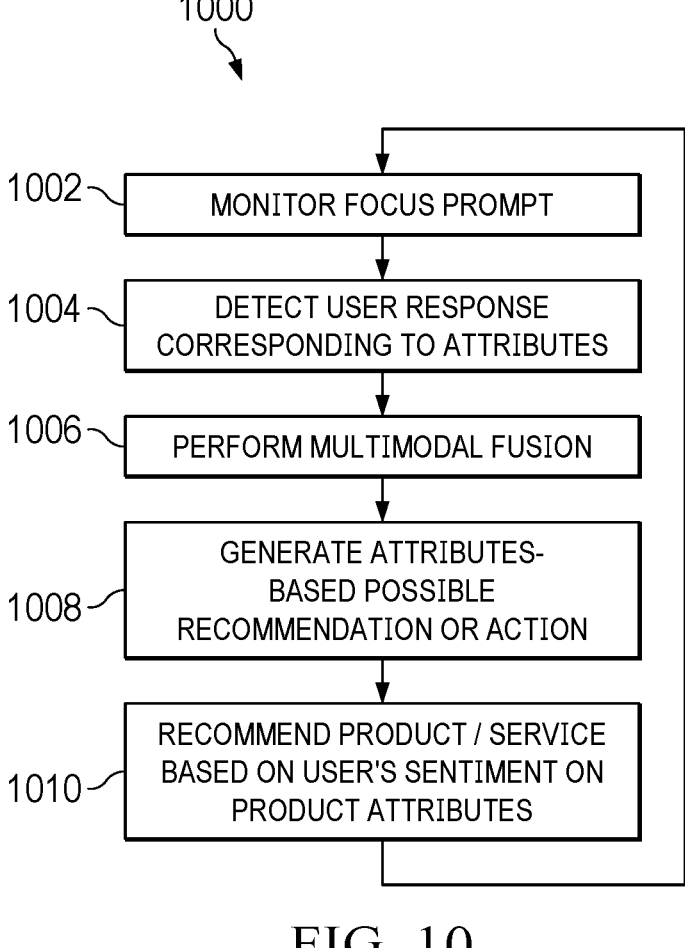
FIG. 10 illustrates a method of attributes-based alternative planning, in accordance with an embodiment.

FIG. 10 illustrates method 1000 of attributes-based alternative planning, in accordance with an embodiment. Method 1000 may be performed by an e-commerce system, such as e-commerce system 100 of FIG. 1. Method 1000 proceeds by one or more actions, which although described in a particular order, may be performed in one or more permutations, according to particular needs.

At activity 1002, one or more sensing devices 170 monitor a focus prompt of the user. As disclosed above, the focus prompts may monitor cursor position, eye cornea reflection tracking, active tab position, and the like. At activity 1004, one or more sensing devices 170 detect a user response corresponding to one or more attributes. For example, when a user is shopping online for a shirt, the user may have a strong positive response when looking at a shirt that has a color attribute of red and a category attribute of athletic wear. At activity 1006, fusion interface system 110 performs multimodal fusion, as described in greater detail above. Continuing the previous example, when the red athletic shirt that the user exhibits strong positive responses towards is out of stock, fusion interface system 110 may determine, using multimodal blend model 240, that the user may search for a different shirt instead. At activity 1008, fusion interface system 110 generates an attributes-based possible recommendation or action. Continuing the example above, fusion interface system 110 may find available shirts that are both red and athletic wear as a substitute for the user to purchase. According to embodiments, activities 1006-1008 may comprise performing method 400 of FIG. 4, method 500 of FIG. 5, and/or method 600 of FIG. 6. At activity 1010, order management system 140 recommends a product or service based on the detected sentiments of the user on particular product attributes, before method 1000 returns to activity 1002 and repeats activities 1002-1010 while e-commerce system 100 is in use. Continuing the previous example, order management system 140 recommends a red athletic wear shirt to the user via user interface 270.

Figure 11:
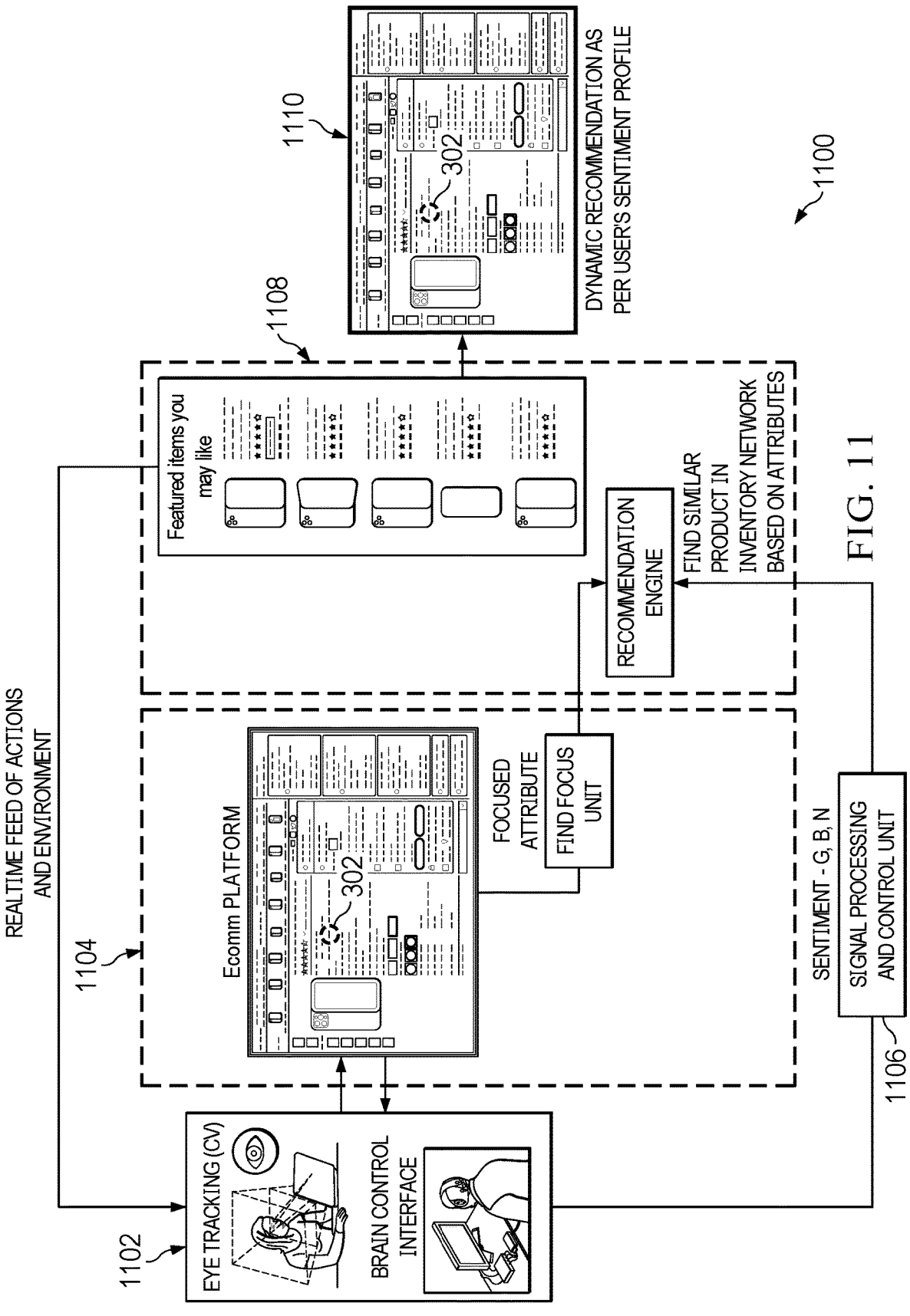
FIG. 11 illustrates an example method of attributes-based alternative planning using the order management system, in accordance with an embodiment.

FIG. 11 illustrates example method 1100 of attributes-based alternative planning using order management system 140, in accordance with an embodiment. Method 1100 may be performed by an e-commerce system, such as e-commerce system 100 of FIG. 1. Method 1100 proceeds by one or more activities, which although described in a particular order, may be performed in one or more permutations, according to particular needs.

At activity 1102, fusion interface system 110 monitors and receives user interaction and input signals, a user environment, and user intent and/or motivation, as disclosed above. In the illustrated embodiment, fusion interface system 110 utilizes one or more sensing devices 170 to monitor focus using, for example, eye tracking, and sentiment using, for example, eye saccade, dilation, and/or a BCI. In the example illustrated by method 1100, order management system 140 provides for purchasing a product (smartphone) and monitors user browsing of desired products based on different attributes such as, for example, color, size, storage capacity, model, and the like, as disclosed above with respect to FIG. 3. At activity 1104, fusion interface system 110 determines a focus prompt from the focus of the user. In this example, the focus of the user is illustrated by gaze indicator 302, which indicates the location or area that one or more sensing devices 170 are detecting as the focus of the user. In addition, or as an alternative, fusion interface system 110 may determine the focus prompt using one or more of the cursor position, eye cornea reflection tracking, active tab position, and the like. Attributes that may be monitored for the focus prompt include, for example, color, price, delivery date, pattern, and the like. At activity 1106 (which according to embodiments may occur substantially simultaneously with activity 1104), fusion interface system 110 monitors a sentiment of the user by a signal processing and control unit, such as, for example, interface module 202. At activity 1108, fusion interface system 110 utilizes recommendation engine 212 to identify a recommendation, such as, for example, a product in inventory system 150 that is expected to evoke a better sentiment for the user based on the sentiment and focused attributes. At activity 1110, order management system 140 displays the recommendation based on the monitored sentiments on respective attributes to the user using, for example, user interface 270. As order management system 140 presents the recommendation to the user (as well as throughout method 1100), fusion interface system 110 continuously monitors the focus and sentiment to generate dynamic recommendation as per the sentiment profile of the user.

By way of further explanation only and not by way of limitation, method 1100 is described in connection with the illustrated example. In this example, order management system 140 displays an e-commerce website providing various smartphone products having different attributes, such as, for example, price, delivery date, colors, and size, among other product features and characteristics. At activity 1102, fusion interface system 110 detects and monitors the gaze of a user utilizing the e-commerce website via eye tracking and facial imaging interface 800, as shown in FIG. 8. Gaze indicator 302 indicates the gaze over the delivery date of the illustrated example, which fusion interface system 110 determines to be the focus prompt at activity 1104. At activity 1106, fusion interface system 110 uses BCI 700, as shown in FIG. 7, and facial imaging interface 800 to detect emotional data 222 of the user, which in this example, indicates that the user is happy during the purchasing process with elevated or happy emotions. Continuing with this example, during the checkout process for the product that the user has selected, BCI 700 and facial imaging interface 800 detect negative emotions from the user at activity 1106, and fusion interface system 110 determines that the gaze of the user indicates that the characteristic causing the negative emotion is the delivery date. E-commerce system 100 then assigns the item attributes of delivery date to the negative emotion. At activity 1108, fusion interface system 110 generates a recommendation of finding faster delivery options, and, in response, e-commerce system 100 directs order management system 140 to initiate a service to search and provide faster delivery options, such as, for example, alternative fulfillment services that deliver more quickly than the standard shipping service. At activity 1110, order management system 140 displays the alternative fulfillment services to the user via user interface 270. Although the previous example is given for an attribute comprising a delivery date, embodiments contemplate recommending substitute items comprising any detected emotional response to an attribute which may include, for example, color, style, design, brand, and the like. For example, a product recommendation may include a cheaper product when a negative focus is on a price, a different size when a positive focus is on a larger screen-sized model, or other like recommendations based on positive emotions, negative emotions, or any other detected basic or complex emotions associated with the focused attribute.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for performing multimodal fusion of computer interactions of a current user to improve productivity and interaction response time of the computer interactions for e-commerce, comprising:
    a computer, comprising a processor and a memory, the computer configured to:
        monitor a focus prompt of the current user;
        detect a response of the current user corresponding to a displayed item;
        collect one or more attributes of the displayed item at different levels and track a focus and an emotional state of the current user;
        calculate an action-based similarity to generate a recommendation score of action similarity;
        apply collaborative filtering on a user-user similarity;
        identify a most similar user to the current user based on the applied collaborative filtering to generate a user-user similarity;
        combine the recommendation score with the user-user similarity and superimpose a response classifier to generate a combined adaptive weighting scheme;
        identify one or more top suggested actions the current user is expected to perform on the computer based on the combined adaptive weighting scheme to improve productivity and interaction response time of the current user with the computer; and
        recommend an item or service on the computer to the current user based on the one or more top suggested actions.

2. The system of claim 1, wherein the focus prompt of the current user comprises a cursor position, eye cornea reflection tracking and an active tab position.

3. The system of claim 1, wherein the recommended item or service is based, at least in part, on one or more detected sentiments of the current user on one or more particular attributes of the displayed item.

4. The system of claim 1, wherein the one or more attributes of the displayed item comprise categorical characteristics or qualities of a product, the attributes further comprising attribute values.

5. The system of claim 1, wherein the response from the current user comprises one or more extracted features from eye movement and facial expressions comprising one or more of:

extracted facial geometric and textual features, one or more saccade frequencies, one or more saccade dispersions, a saccade amplitude, an eye blink frequency and an eye fixation frequency.

6. The system of claim 1, wherein the computer is further configured to:

automatically recognize a particular user; and tag monitored interface data, behavioral data and emotional data associated with the recognized particular user.

7. The system of claim 1, wherein the computer is further configured to:

generate the response classifier by superimposing a matrix tensor with one or more social effects and historical data.

8. A computer-implemented method for performing multimodal fusion of computer interactions of a current user to improve productivity and interaction response time of the computer interactions for e-commerce, comprising:

monitoring, by a computer comprising a processor and a memory, a focus prompt of the current user;

detecting, by the computer, a response of the current user corresponding to a displayed item;

collecting, by the computer, one or more attributes of the displayed item at different levels and track a focus and an emotional state of the current user;

calculating, by the computer, an action-based similarity to generate a recommendation score of action similarity;

applying, by the computer, collaborative filtering on a user-user similarity;

identifying, by the computer, a most similar user to the current user based on the applied collaborative filtering to generate a user-user similarity;

combining, by the computer, the recommendation score with the user-user similarity and superimpose a response classifier to generate a combined adaptive weighting scheme;

identifying, by the computer, one or more top suggested actions the current user is expected to perform on the computer based on the combined adaptive weighting scheme to improve productivity and interaction response time of the current user with the computer; and recommending, by the computer, an item or service on the computer to the current user based on the one or more top suggested actions.

9. The computer-implemented method of claim 8, wherein the focus prompt of the current user comprises a cursor position, eye cornea reflection tracking and an active tab position.

10. The computer-implemented method of claim 8, wherein the recommended item or service is based, at least in part, on one or more detected sentiments of the current user on one or more particular attributes of the displayed item.

11. The computer-implemented method of claim 8, wherein the one or more attributes of the displayed item comprise categorical characteristics or qualities of a product, the attributes further comprising attribute values.

12. The computer-implemented method of claim 8, wherein the response from the current user comprises one or more extracted features from eye movement and facial expressions comprising one or more of:

extracted facial geometric and textual features, one or more saccade frequencies, one or more saccade dispersions, a saccade amplitude, an eye blink frequency and an eye fixation frequency.

13. The computer-implemented method of claim 8, further comprising:

automatically recognizing, by the computer, a particular user; and tagging, by the computer, monitored interface data, behavioral data and emotional data associated with the recognized particular user.

14. The computer-implemented method of claim 8, further comprising:

generating, by the computer, the response classifier by superimposing a matrix tensor with one or more social effects and historical data.

15. A non-transitory computer-readable medium embodied with software for performing multimodal fusion of computer interactions of a current user to improve productivity and interaction response time of the computer interactions for e-commerce, the software when executed is configured to:

monitor, by a computer comprising a processor and a memory, a focus prompt of the current user;

detect a response of the current user corresponding to a displayed item;

collect one or more attributes of the displayed item at different levels and track a focus and an emotional state of the current user;

calculate an action-based similarity to generate a recommendation score of action similarity;

apply collaborative filtering on a user-user similarity;

identify a most similar user to the current user based on the applied collaborative filtering to generate a user-user similarity;

combine the recommendation score with the user-user similarity and superimpose a response classifier to generate a combined adaptive weighting scheme;

identify one or more top suggested actions the current user is expected to perform on the computer based on the combined adaptive weighting scheme to improve productivity and interaction response time of the current user with the computer; and recommend an item or service on the computer to the current user based on the one or more top suggested actions.

16. The non-transitory computer-readable medium of claim 15, wherein the focus prompt of the current user comprises a cursor position, eye cornea reflection tracking and an active tab position.

17. The non-transitory computer-readable medium of claim 15, wherein the recommended item or service is based, at least in part, on one or more detected sentiments of the current user on one or more particular attributes of the displayed item.

18. The non-transitory computer-readable medium of claim 15, wherein the one or more attributes of the displayed item comprise categorical characteristics or qualities of a product, the attributes further comprising attribute values.

19. The non-transitory computer-readable medium of claim 15, wherein the response from the current user comprises one or more extracted features from eye movement and facial expressions comprising one or more of:

extracted facial geometric and textual features, one or more saccade frequencies, one or more saccade dispersions, a saccade amplitude, an eye blink frequency and an eye fixation frequency.

20. The non-transitory computer-readable medium of claim 15, wherein the software when executed is further configured to:

automatically recognize a particular user; and tag monitored interface data, behavioral data and emotional data associated with the recognized particular user.

\* \* \* \* \*